United States Patent [19]

Bradford et al.

[11] Patent Number: 5,250,659
[45] Date of Patent: Oct. 5, 1993

[54] USE OF 1,3-DIOXACYCLOPENTANE AS A SOLVENT FOR POLYESTER RESINS

[75] Inventors: Linwood E. Bradford, Cambridge, Mass.; Patricia Flannagan, Allamuchy; Ronald J. Caimi, Somerset, both of N.J.

[73] Assignee: National Starch and Chemical Investment Holding Corporation, Wilmington, Del.

[21] Appl. No.: 880,633

[22] Filed: May 8, 1992

[51] Int. Cl.$^5$ .............................................. C08J 3/02
[52] U.S. Cl. ................................... 528/494; 528/272; 528/274; 528/296; 528/302; 528/493; 524/113; 524/356; 524/366; 524/755
[58] Field of Search ............... 528/272, 274, 296, 302, 528/493, 494; 524/356, 366, 755, 113

[56] References Cited

U.S. PATENT DOCUMENTS

| | | | |
|---|---|---|---|
| 4,075,263 | 2/1978 | Lane et al. | 525/58 |
| 4,298,724 | 11/1981 | Sommerfield et al. | 528/302 |
| 4,419,476 | 12/1983 | Coughlin et al. | 524/284 |
| 4,486,508 | 12/1984 | Coughlin et al. | 428/480 |
| 4,487,909 | 12/1984 | Couhglin et al. | 528/60 |
| 4,581,093 | 4/1986 | Noyes et al. | 156/307.3 |

FOREIGN PATENT DOCUMENTS 53-46353  4/1978  Japan .

OTHER PUBLICATIONS

*Poligrafiia*, 1983, No. 7, "A Substitute for Formal Glycol", pp. 29–30, Krikunova, V. and Semenova, R., translated from the Russian.
Material Safety Data Sheet on 1,3-dioxacyclopentane.
DuPont Bulletin on Polyester Resins, Adhesives and Coatings.
List of solubility parameters, from Polymer Handbook, Wiley Interscience.

*Primary Examiner*—Samuel A. Acquah
*Attorney, Agent, or Firm*—Jane E. Gennaro; Edwin M. Szala

[57] ABSTRACT

Polyester resins, comprising the polymerized residues of dibasic acids and diols, dibasic anhydrides and diols, and the lower alkyl esters of dibasic acids and diols, are soluble up to 40% by weight of solids in 1,3-dioxacyclopentane, and blends of 1,3-dioxacyclopentane with other relatively nontoxic solvents.

8 Claims, No Drawings

USE OF 1,3-DIOXACYCLOPENTANE AS A SOLVENT FOR POLYESTER RESINS

FIELD OF THE INVENTION

This invention relates to solutions of crystalline polyesters for use in heat-sealable coating and adhesive applications. The polyesters were formerly known to be soluble only in highly toxic solvents, such as dioxane and chlorinated solvents, and are now known to be soluble in 1,3-dioxacyclopentane and in solvent blends containing 1,3-dioxacyclopentane and other relatively nontoxic cosolvents.

BACKGROUND OF THE INVENTION

Polyester resins, both branched and linear, are used in various heat-sealable adhesive and protective coating applications. Some of these applications require that the resins be dissolved or diluted with a solvent. The low molecular weight polyesters are readily soluble in common organic solvents. The high molecular weight and partially crystalline polyesters are not easily soluble. It has been disclosed in U.S. Pat. Nos. 4,419,476, 4,298,724, 4,581,093, 4,486,508, and 4,487,909 that if high molecular weight polyesters are branched they can be made soluble in inexpensive, relatively nontoxic organic solvents. It is the linear polyesters, however, that impart improved chemical and heat resistance to the adhesives and coatings in which they are used, and these linear, crystalline polyesters are not soluble in the same relatively nontoxic solvents.

Currently, the high molecular weight, linear polyesters are most commonly dissolved in dioxane and chlorinated solvents. Dioxane emits formaldehyde, a suspect carcinogen, and halogenated compounds are also considered suspect carcinogens, which makes their use as solvents environmentally questionable and potentially dangerous to health. Attempts to find innocuous substitutes have been hindered by marginal solubility of the linear polyester resins in the less toxic solvents, or by solvent evaporation rates that are either too fast or too slow to be functional in coating applications. Thus, there exists a need for solutions of high molecular weight, linear, partially crystalline polyesters in a solvent formulation that is low in toxicity, and consequently without the disadvantageous environmental and health related effects of the organic solvents commonly used for those polyester resins.

SUMMARY OF THE INVENTION 1,3-Dioxacyclopentane, also known as ethylene glycol methylene ether, formal glycol, or 1,3-dioxolane, has been found to be a suitable solvent for high molecular weight, crystalline, long chain, linear polyesters. This invention comprises a solution of a polyester resin for coating or adhesive application in 1,3-dioxacyclopentane as the sole organic solvent, or in a blend of cosolvents in which 1,3-dioxacyclopentane is present in an amount at least 25% of the solvent blend.

The solution comprises, in a total of 100 parts by weight, (A) up to 40 parts by weight of a polyester prepared from dibasic acids and diols, dibasic anhydrides and diols, the lower alkyl esters of dibasic acids and diols, and combinations of those, and (B) at least 60 parts by weight of solvent comprising (i) 1,3-dioxacyclopentane, present in an amount at least 25% by weight of the solvent, and (ii) optionally, a non-halogenated, cosolvent selected from the group consisting of $C_7$-$C_{10}$ aromatics, $C_3$-$C_8$ ketones, ethers, and the lower alkyl esters of $C_2$-$C_4$ carboxylic acids, and combinations of those, present in an amount from 0 to 75% by weight of the solvent.

DETAILED DESCRIPTION OF THE INVENTION

The polyester solutions of this invention are made by dissolving a polyester resin, suitable for use in a coating or adhesive application, in 1,3-dioxacyclopentane. This solvent, commercially available from Ferro Corporation, Grant Chemical Division, Baton Rouge, Louisiana, is relatively nontoxic and dissolves those high molecular weight, linear, crystalline polyesters that are virtually insoluble in other common, relatively nontoxic solvents. Although other common solvents cannot dissolve crystalline polyesters when they are used as the sole organic solvent, some, but not all, can be used with 1,3-dioxacyclopentane in a cosolvent blend that will dissolve the crystalline polyesters. The ability of the 1,3-dioxacyclopentane, and the ability of certain other solvents to act as cosolvents, was not discernible from the examination of standard solubility parameters. The data below show, for example, that tetrahydrofuran exhibited better solubility characteristics than methyl ethyl ketone, despite a contrary prediction with the use of solubility parameters. (Solubility parameters can be obtained in the Polymer Handbook, published by Wiley Interscience.)

Suitable cosolvents with the 1,3-dioxacyclopentane are non-halogenated solvents and include $C_7$-$C_{10}$ aromatics having a methyl group or groups attached to the ring in the ortho, meta, or para positions, and benzine naphthalenes (also known as VM&P, varnish makers' and painters' naphthalenes, which are not generally characterized and which are obtained from petroleum distillation process); $C_3$-$C_8$ ketones; cyclic ethers, and ethers having the general formula R—O—R', in which R can be methyl, ethyl, propyl or butyl, and R' can be methyl, ethyl, propyl, butyl, ethylene glycol, and diethylene glycol; and the lower alkyl esters of $C_2$-$C_4$ carboxylic acids, and combinations of those.

Representative aromatics include toluene, aromatic naphthalene, xylene, and benzyl alcohol. Representative ketones include acetone, methyl ethyl ketone, methyl isobutyl ketone, isophorone, N-methyl pyrrolidone, cyclopentanone and cyclohexanone. Representative ethers are tetrahydrofuran, and ethylene glycol monoethyl ether, ethylene glycol monobutyl ether, diethylene glycol monomethyl ether, diethylene glycol monoethyl ether, diethylene glycol monobutyl ether, and their acetates. Representative esters of $C_2$-$C_4$ carboxylic acids include methyl, ethyl, propyl, butyl, and amyl acetates, propionates, lactates and butyrates, and their isomers. These cosolvents can be used in combination with each other, provided that the 1,3-dioxacyclpentane is also a cosolvent.

In general, the polyester solutions of this invention will consist by weight essentially of 15–40 parts, preferably 20–25 parts, of an appropriate polyester resin, preferably dissolved in at least 60 parts of 1,3-dioxacyclopentane as the sole organic solvent, or dissolved in at least 60 parts of a solvent blend comprising 1,3-dioxacyclopentane present in an amount at least 25% by weight of the solvent blend, and of a suitable cosolvent. The more preferred cosolvents will be selected from the group consisting of tetrahydrofuran, methyl ethyl ketone, toluene, and ethyl acetate, and they will be present in an amount up to 75% by weight of the solvent blend, to make a total of 100 parts of polyester solution. These solvents have relatively low levels of toxicity, and have evaporation rates that are functional for coating and adhesive applications.

Any polyester resin for a coating or adhesive application that has utility in solution and that is soluble in 1,3-dioxacyclopentane, may be used to formulate the polyester solutions of this invention. The precise formulation of the various types of polyesters will depend upon the specific end use.

Representative polyester resins suitable for use as heat sealable coatings include those made from dibasic acids and diols (higher polyols act as branching agents). Suitable dibasic acids include, but are not limited to, succinic acid, adipic acid, glutaric acid, azelaic acid, sebacic acid, phthalic acid, isophthalic and terephthalic acids. Suitable diols have 2-14 carbons in the chain and include, but are not limited to, ethylene glycol, 1,4-butanediol, 1,2-propanediol, 1,3-propanediol, 1,4-cyclohexanedimethanol, and polyethylene glycol. The polyesters may also be derived from the anhydrides of the dibasic acids, or from a transesterification from the lower alkyl ester of the acid.

Alternatively, linear polyester resins suitable for coating and adhesive applications can be obtained commercially, for example, from Morton Chemical, Elk Grove, Ill. under the tradenames Morester ® 49000 and Morester ® 49002; and from Goodyear, Akron, Ohio, under the tradenames Resin Vitels ® 1700 and Resin Vitels ® 1900.

When these polyesters are used in coating compositions, additives conventionally used with these polyesters in coating compositions may be employed in the conventional amounts. Examples of additives in representative amounts used are crosslinking agents, long chain fatty acid amides, petrolatum, polyethylene wax, and paraffin, used alone or in combination, in amounts from 0.05-10 parts of the total weight of solids.

When heat sealing is done in-line with the coating process, crosslinking agents usually are added to impart additional heat resistance and chemical resistance. Examples of conventional crosslinking agents in representative amounts used are isocyanate crosslinkers, such as toluene diisocyanate, 4,4'-methylene-bis(diphenyl diisocyanate), the 5/2 molar adduct of toluene diisocyanate and trimethylolpropane, the 2/1molaradduct of toluene diisocyanate and diethylene glycol, and 1,6-hexamethylene diisocyanate, in amounts up to about 15 parts of the total weight of solids; and polymeric diisocyanates based on isophoronediisocyanate, and optional trimethoxysilane coupling agents containing amino, epoxy, ether, or mercapto groups, in amounts not to exceed 3 parts of the total weight of solids.

The resultant coating compositions, when appropriately formulated and coated, may be used, for example, as heat-seal lidding for food products, such as butter, yoghurt, and jelly; as packaging for foods to be microwaved or oven heated; and as industrial laminates, such as, in sail cloth, cable wrap, flexible circuitry, and solar protection film.

When these compositions are used in adhesive applications, the abovementioned crosslinking agents may be used to impart additional bond strength, and chemical and heat resistance.

EXAMPLES

The following examples show the solubility at varying solids contents by weight of four commercially available and substantially linear polyester resin compositions in 1,3-dioxacyclopentane and in 1,3-dioxacyclopentane with cosolvents, and the insolubility of the same resins in other available and commonly used non-toxic organic solvents.

The resins tested were Morester ® 49000 and Morester ® 49002 from Morton Chemical, and Vitel ® 1900 from Goodyear. All four of the resins are substantially linear and have some degree of crystallinity, the 49002 and the 1900 being more crystalline than 49000 and 1700, respectively.

The resins and solvents were placed in sealed jars on a roller mill and mixed for 24 hours at room temperature. The resins were considered soluble if at the end of 24 hours the contents of the jar were clear, and they were considered insoluble if the contents showed gelling or phasing.

The results are set out in the following tables.

TABLE 1

SOLUBILITY OF LINEAR POLYESTERS AT 15% SOLIDS

| | RESINS | | | |
|---|---|---|---|---|
| SOLVENTS | 49000 | 49002 | 1700 | 1900 |
| (DOCP) 1,3-dioxacyclopentane | + | + | + | + |
| (THF) tetrahydrofuran | + | − | + | − |
| (IOPH) isopropanol | − | − | − | − |
| (HEP) heptane | − | − | − | − |
| (MEK) methyl ethyl ketone | − | − | − | − |
| (TOL) toluene | − | − | − | − |
| (ETAC) ethyl acetate | − | − | − | − |
| (ACE) acetone | | − | | − |
| (CYHX) cyclohexanone | | − | | − |

+ indicates soluble
− indicates insoluble

An examination of the solubility parameters from the Polymer Handbook, Wiley Interscience, would lead to the prediction that methyl ethyl ketone, acetone, and cyclohexanone would have dissolved the polyesters as readily as 1,3-dioxcyclopentane, but in fact, Table 1 shows that resins 49002 and 1900, having the greater degree of crystallinity compared to the other two resins, 49000 and 1700, respectively, were obstinatelly insoluble in common organic solvents and were soluble at 15% solids only in 1,3-dioxacyclopentane.

TABLE 2

SOLUBILITY OF LINEAR POLYESTERS
AT 15% SOLIDS IN SOLVENT BLENDS

| | RESINS | | | |
|---|---|---|---|---|
| SOLVENT BLENDS (%) | 49000 | 49002 | 1700 | 1900 |
| 75 DOCP: 25 THF | + | + | + | + |
| 75 DOCP: 25 MEK | + | + | + | − |
| 75 DOCP: 25 TOL | + | + | + | + |
| 75 DOCP: 25 ETAC | + | − | + | − |
| 75 DOCP: 25 IPOH | + | − | + | − |
| 75 DOCP: 25 HEP | − | − | − | − |
| 75 DOCP: 25 ACE | | + | | − |
| 75 DOCP: 25 CYHX | | + | | + |
| 50 DOCP: 50 THF | + | + | + | − |
| 50 DOCP: 50 MEK | + | − | + | − |
| 50 DOCP: 50 TOL | + | − | + | − |
| 50 DOCP: 50 ETAC | + | − | + | − |
| 25 DOCP: 75 THF | + | + | + | − |
| 25 DOCP: 75 MEK | + | − | + | − |
| 25 DOCP: 75 TOL | + | − | + | − |
| 25 DOCP: 75 ETAC | + | − | + | − |

TABLE 2-continued

SOLUBILITY OF LINEAR POLYESTERS
AT 15% SOLIDS IN SOLVENT BLENDS

| SOLVENT BLENDS (%) | RESINS | | | |
|---|---|---|---|---|
| | 49000 | 49002 | 1700 | 1900 |
| 25 DOCP: 75 IPOH | − | − | − | − |

+ indicates soluble
− indicates insoluble

Table 2 show that solvent blends consisting of 75% 1,3-dioxacyclopentane with tetrahydrofuran, methyl ethyl ketone, cyclohexanone, acetone and toluene, can be used to dissolve the 49002 resin at 15% solids, and solvent blends consisting of 75% 1,3-dioxacyclopentane with tetrahydrofuran, cyclohexanone, and toluene can be used to dissolve the 1900 resin, at 15% solids. The solubility parameters of these cosolvents would have predicted that acetone and methyl ethyl ketone would have been more suitable cosolvents for the 1900 resin than tetrahydrofuran, but in fact, they were not.

TABLE 3

SOLUBILITY OF LINEAR POLYESTER RESINS
AT 15-50% SOLIDS

| SOLVENT | SOLIDS | RESINS | | | |
|---|---|---|---|---|---|
| | | 49000 | 49002 | 1700 | 1900 |
| THF | 15 | + | − | + | − |
| | 20 | + | − | + | − |
| | 25 | + | − | + | − |
| | 30 | + | − | + | − |
| | 35 | + | − | + | − |
| | 40 | + | − | + | − |
| | 45 | + | − | − | − |
| | 50 | − | − | − | − |
| DOCP | 15 | + | + | + | + |
| | 20 | + | + | + | − |
| | 25 | + | − | + | − |
| | 30 | + | − | + | − |
| | 35 | + | − | + | − |
| | 40 | + | − | + | − |
| | 45 | − | − | − | − |
| | 50 | − | − | − | − |

Table 3 shows that the 49000 and 1700 resins can be dissolved in 1,3-dioxacyclopentane and in tetrahydrofuran up to 40% solids, and that the resins with greater crystallinity, 49002 and 1900, can be dissolved at 20% and 15% solids respectively, only in 1,3-dioxacyclopentane, and not in tetrahydrofuran.

The data show that 1,3-dioxacyclopentane can be used as a solvent for linear, crystalline polyesters that are not soluble in other common, relatively nontoxic solvents.

We claim:

1. A solution of a substantially linear polyester resin by weight total of 100 parts comprising:
   (A) 15–40 parts of polyester resin comprising the polymerized residues of dibasic acids and diols, dibasic anhydrides and diols, the lower alkyl esters of dibasic acids and diols, and combinations of those, and
   (B) at least 60 parts of solvent comprising by weight of the solvent
      (i) 25–100% 1,3-dioxacyclopentane, and
      (ii) 0–75% non-halogenated cosolvent.

2. The solution according to claim 1 in which the cosolvent is selected from the group consisting of $C_7$–$C_{10}$ aromatics having a methyl group or groups attached to the ring in the ortho, meta, or para positions, and benzine naphthalenes; $C_3$–$C_8$ ketones; cyclic ethers, and ethers having the general formula R—O—R′, in which R can be methyl, ethyl, propyl or butyl, and R′ can be methyl, ethyl, propyl, butyl, ethylene glycol, and diethylene glycol; and the lower alkyl esters of $C_2$–$C_4$ carboxylic acids, and combinations of those.

3. The solution according to claim 1 in which the cosolvent is an aromatic selected from the group consisting of toluene, xylene, benzyl alcohol, and naphthalene.

4. The solution according to claim 1 in which the cosolvent is a ketone selected from the group consisting of methyl ethyl ketone, isophorone, methyl isobutyl ketone, acetone, cyclohexanone, and cyclopentanone.

5. The solution according to claim 1 in which the cosolvent is an ether acetate selected from the group consisting of tetrahydrofuran, ethylene glycol monoethyl ether, ethylene glycol monobutyl ether, diethylene glycol monomethyl ether, diethylene glycol monoethyl ether, and diethylene glycol monobutyl ether.

6. The solution according to claim 1 in which the cosolvent is a lower alkyl ester of a carboxylic acid selected from the group consisting of methyl, ethyl, n-propyl, isopropyl, n-butyl, isobutyl, n-pentyl, isopentyl, and neopentyl acetates, propionates, and butyrates.

7. The solution according to claim 1 in which the solvent is a solvent blend comprising at least 25% by weight of 1,3-dioxacyclopentane and up to 75% by weight of a cosolvent selected from the group consisting of tetrahydrofuran, methyl ethyl ketone, toluene, acetone and cyclohexanone and combinations of those.

8. The solution according to claim 1 in which the cosolvent is an ether acetate selected from the group consisting of ethylene glycol monoethyl ether acetate, ethylene glycol monobutyl ether acetate, diethylene glycol monomethyl ether acetate, diethylene glycol monoethyl ether acetate, and diethylene glycol monobutyl ether acetate.

* * * * *

REEXAMINATION CERTIFICATE (3555th)

United States Patent [19]
Bradford et al.

[11] B1 5,250,659
[45] Certificate Issued Jun. 23, 1998

[54] USE OF 1,3-DIOXACYCLOPENTANE AS A SOLVENT FOR POLYESTER RESINS

[75] Inventors: Linwood E. Bradford, Cambridge, Mass.; Patricia Flannagan, Allamuchy; Ronald J. Caimi, Somerset, both of N.J.

[73] Assignee: National Starch and Chemical Investment Holding Corporation, Wilmington, Del.

Reexamination Request:
No. 90/003,391, Apr. 8, 1994

Reexamination Certificate for:
Patent No.: 5,250,659
Issued: Oct. 5, 1993
Appl. No.: 880,633
Filed: May 8, 1992

[51] Int. Cl.⁶ .................................................. C08J 3/02
[52] U.S. Cl. ...................... 528/494; 528/272; 528/274; 528/296; 528/302; 528/493; 528/494; 524/356; 524/366; 524/755; 524/113
[58] Field of Search .................. 528/272, 274, 528/296, 302, 493, 494; 524/356, 366, 755, 113

[56] References Cited

PUBLICATIONS

Polygrafiya, 1983, No. 7, "A Substitute for Formal Glycol" pp. 29–30, Krikunova, V. and Semenova, R. (Russian & Translation).
Chemical Abstracts 99:141175s (abstracting above).
Computer generated description of Registry No. 29154–49–2 (explanatory reference).
PETEFLEX Product Information Bulletin Published prior to 30 Mar. 1990.
Whitaker information sheet listing solubilities of 4900 series resins, published prior to 30 Mar. 1990.
DuPont Bulletin on Polyester Resins (cited in patent).
Chemical Abstracts 93 entry 115471s (abstracting 1980 Russian language SU patent SU 729647, 25 Apr. 1980).

*Primary Examiner*—Sam A. Acquah

[57] ABSTRACT

Polyester resins, comprising the polymerized residues of dibasic acids and diols, dibasic anhydrides and diols, and the lower alkyl esters of dibasic acids and diols, are soluble up to 40% by weight of solids in 1,3-dioxacyclopentane, and blends of 1,3-dioxacyclopentane with other relatively non-toxic solvents.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–8 are determined to be patentable as amended.

New claims 9–15 are added and determined to be patentable.

1. A solution of a [substantially linear] polyester resin, *the solution* by weight total of 100 parts comprising:
   (A) 15–40 parts of *a crystalline and substantially linear* polyester resin *that is not soluble at 15*
   solids by weight in tetrahydrofuran, the resin comprising the polymerized residues of dibasic acids and diols, dibasic anhydrides and diols, the lower alkyl esters of dibasic acids and diols, and combinations of those, and
   (B) [at least] *85* -60 parts of solvent by weight of the solvent
      (i) 25–100% 1,3-dioxacyclopentane, and
      (ii) 0–75% non-halogenated cosolvent.

2. The solution according to [claim 1] *any one of claims 1 and 9–15* in which the cosolvent is selected from the group consisting of $C_{7}-C_{10}$ aromatics having a methyl group or groups attached to the ring in the ortho, meta, or para positions, and benzine naphthalenes; $C_3-C_8$ ketones; cyclic ethers, and ethers having the general formula R—O—R', in which R can be methyl, ethyl, propyl or butyl, and R' can be methyl, ethyl, propyl, butyl, ethylene glycol, and diethylene glycol; and the lower alkyl esters of $C_2-C_4$ carboxylic acids and combinations of those.

3. The solution according to [claim 1] *any one of claims 1 and 9–15* in which the cosolvent is an aromatic selected from the group consisting of toluene, xylene, benzyl alcohol, and naphthalene.

4. The solution according to [claim 1] *any one of claims 1 and 9–15* in which the cosolvent is a ketone selected from the group consisting of methyl ethyl ketone, isophorone, methyl isobutyl ketone, acetone, cyclohexanone, and cyclopentanone.

5. The solution according to [claim 1] *any one of claims 1 and 9–15* in which the cosolvent is an ether [acetate] selected from the group consisting of tetrahydrofuran, ethylene glycol monoethyl ether, ethylene glycol monobutyl ether, diethylene glycol monomethyl ether, diethylene glycol monoethyl ether, and diethylene glycol monobutyl ether.

6. The solution according to [claim 1] *any one of claims 1 and 9–15* in which the cosolvent is a lower alkyl ester of a carboxylic acid selected from the group consisting of methyl, ethyl, n-propyl, isopropyl, n-butyl, isobutyl, n-pentyl, isopentyl, and neopentyl acetates, propionates, and butyrates.

7. The solution according to [claim 1] *any one of claims 1 and 9–15* in which the [solvent is a solvent blend comprising at least 25% by weight of 1,3-dioxacyclopentane and up to 75% by weight of a] cosolvent *is* selected from the group consisting of tetrahydrofuran, methyl ethyl ketone, toluene, acetone, [and] cyclohexanone *and combinations of those*.

8. The solution according to [claim 1] *any one of claims 1 and 9–15* in which the cosolvent is an ether acetate selected from the group consisting of ethylene glycol monoethyl ether acetate, ethylene glycol monobutyl ether acetate, diethylene glycol monomethyl ether acetate, diethylene glycol monoethyl ether acetate, and diethylene glycol monobutyl ether acetate.

9. *A solution of a polyester resin, the solution by weight total of 100 parts comprising:*
   (A) *15–40 parts of a crystalline and substantially linear polyester resin that is not soluble at 15% solids by weight in isopropanol, the resin comprising the polymerized residues of dibasic acids and diols, dibasic anhydrides and diols, the lower alkyl esters of dibasic acids and diols, and combinations of those, and*
   (B) *85–60 parts of solvent comprising by weight of the solvent*
      (i) *25–100% 1,3-dioxacyclopentane, and,*
      (ii) *0–75% non-halogenated cosolvent.*

10. *A solution of a polyester resin, the solution by weight total of 100 parts comprising:*
   (A) *15–40 parts of a crystalline and substantially linear polyester resin that is not soluble at 15% solids by weight in heptane, the resin comprising the polymerized residues of dibasic acids and diols, dibasic anhydrides and diols, the lower alkyl esters of dibasic acids and diols, and combinations of those, and*
   (B) *85–60 parts of solvent comprising by weight of the solvent*
      (i) *25–100% 1,3-dioxacyclopentane, and*
      (ii) *0–75% non-halogenated cosolvent.*

11. *A solution of a polyester resin, the solution by weight total of 100 parts comprising:*
   (A) *15–40 parts of a crystalline and substantially linear polyester resin that is not soluble at 15% solids by weight in methylethyl ketone, the resin comprising the polymerized residues of dibasic acids and diols, dibasic anhydrides and diols, the lower alkyl esters of dibasic acids and diols, and combinations of those, and*
   (B) *85–60 parts of solvent comprising by weight of the solvent*
      (i) *25–100% 1,3-dioxacyclopentane, and*
      (ii) *0–75% non-halogenated cosolvent.*

12. *A solution of a polyester resin, the solution by weight total of 100 parts comprising*
   (A) *15–40 parts of a crystalline and substantially linear polyester resin that is not soluble at 15% solids by weight in toluene, the resin comprising the polymerized residues of diabasic acids and diols, dibasic anhydrides and diols, the lower alkyl esters of dibasic acids and diols, and combinations of those, and*
   (B) *85–60 parts of solvent comprising by weight of the solvent*
      (i) *25–100% 1,3-dioxacyclopentane, and*
      (ii) *0–75% non-halogenated cosolvent.*

13. *A solution of a polyester resin, the solution by weight total of 100 parts comprising:*
   (A) *15–40 parts of a crystalline and substantially linear polyester resin that is not soluble at 15*
   solids by weight in ethyl acetate, the resin comprising the polymerized residues of dibasic acids and diols, dibasic anhydrides and diols, the lower alkyl esters of dibasic acids and diols, and combinations of those, and
   (B) *85–60 parts of solvent comprising by weight of the solvent*

(i) 25–100
1,3-*dioxacyclopentane, and*
(ii) 0–75
non-*halogenated cosolvent.*

14. *A solution of a polyester resin, the solution by weight total of 100 parts comprising:*
   (A) *15–40 parts of a crystalline and substantially linear polyester resin that is not soluble at 15% solids by weight in acetone, the resin comprising the polymerized residues of dibasic acids and diols, dibasic anhydrides and diols, the lower alkyl esters of dibasic acids and diols, and combinations of those, and*
   (B) *85–60 parts of solvent comprising by weight of the solvent*
      (i) 25–*100% 1,3*-dioxacyclopentane, and
      (ii) 0–75 non-*halogenated cosolvent.*

15. *A solution of a polyester resin, the solution by weight total of 100 parts comprising:*
   (A) *15–40 parts of a crystalline and substantially linear polyester resin that is not soluble at 15% solids by weight in cyclohexanone, the resin comprising the polymerized residues of dibasic acids and diols, dibasic anhydrides and diols, the lower alkyl esters of dibasic acids and diols, and combinations of those, and*
   (B) *85–60 parts of solvent comprised by weight of the solvent*
      (i) *25–100% 1,3-dioxacyclopentane, and*
      (ii) *0–75% non-halogenated cosolvent.*

* * * * *